Sept. 26, 1939.        C. B. PARSONS        2,174,274
KITCHEN CABINET
Filed July 31, 1936        3 Sheets-Sheet 1
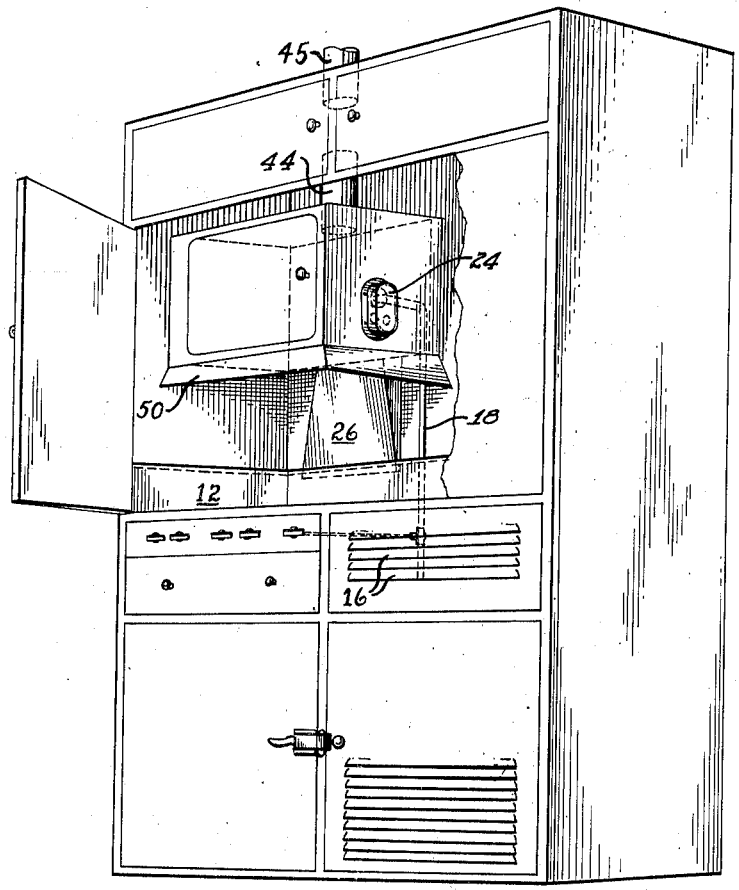
Fig. 1
Fig. 3
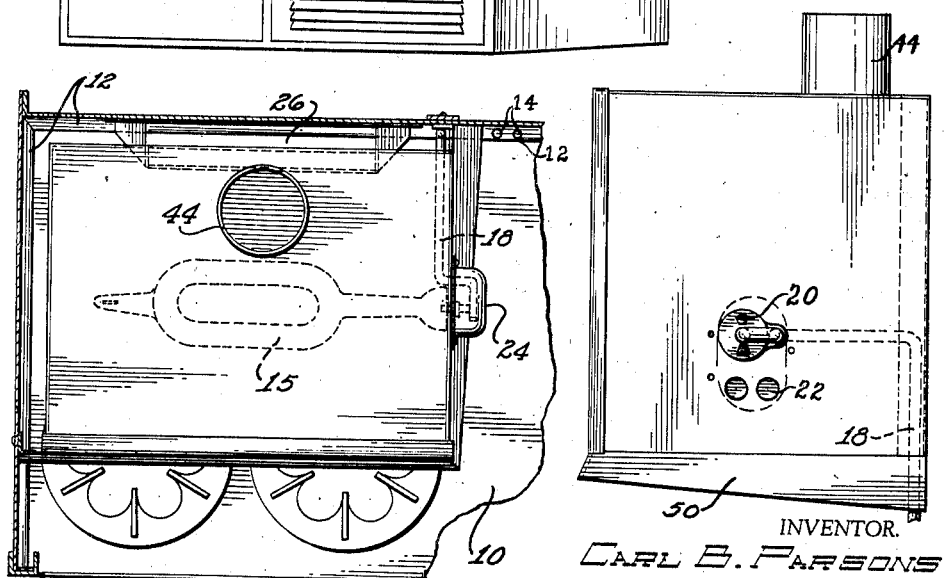
Fig. 2
INVENTOR.
CARL B. PARSONS
BY
Parker and Burton
ATTORNEY.

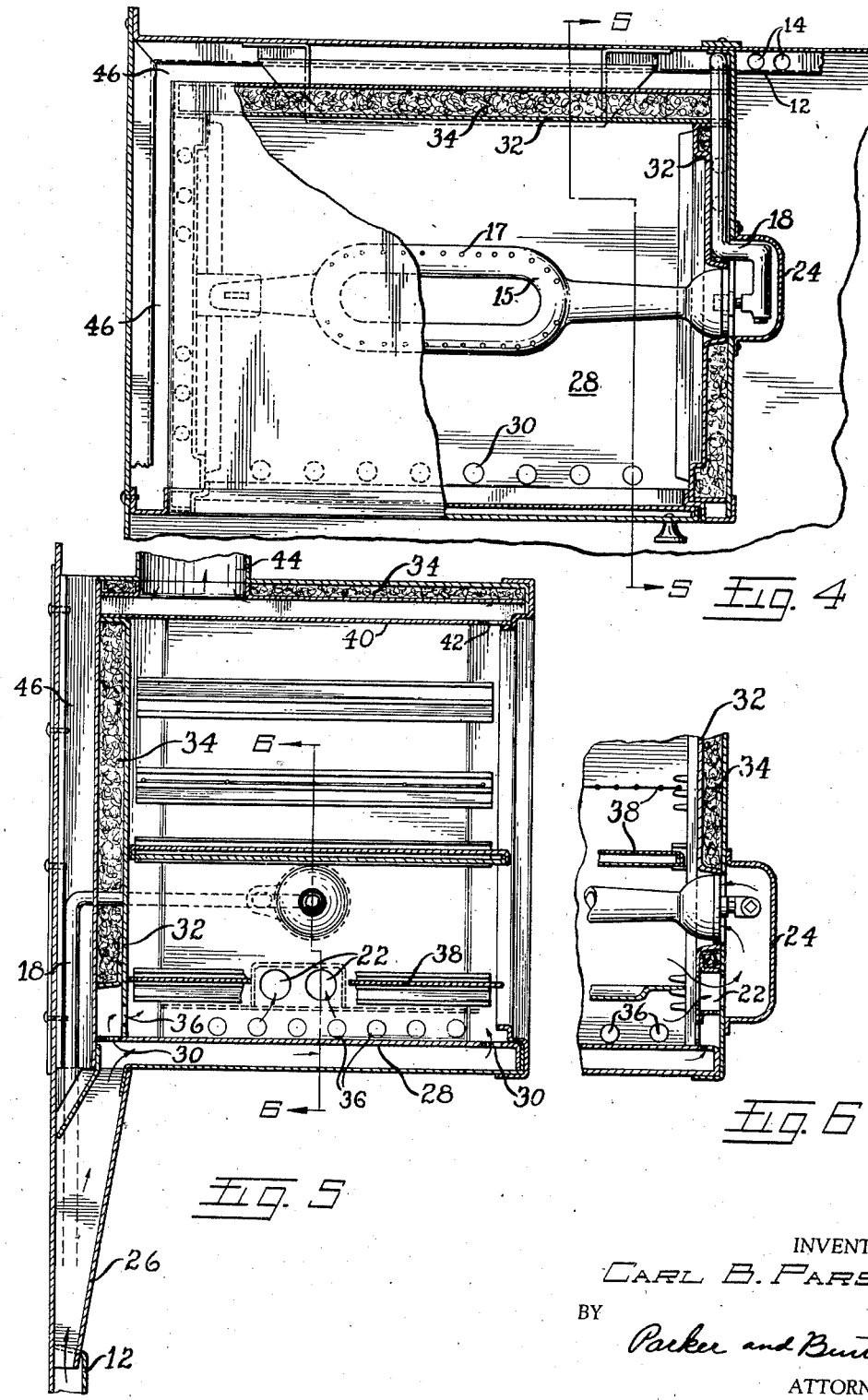

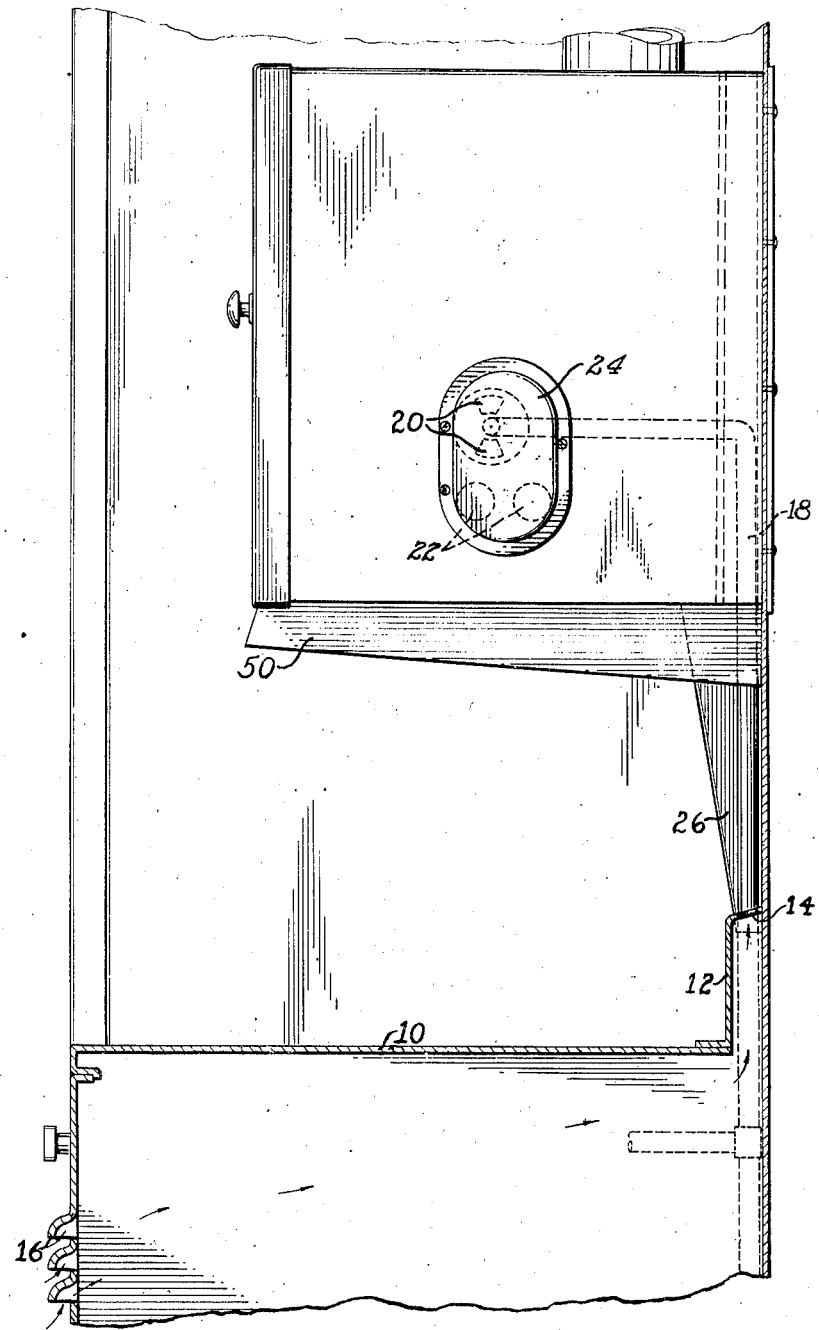

Patented Sept. 26, 1939

2,174,274

UNITED STATES PATENT OFFICE 2,174,274

KITCHEN CABINET

Carl B. Parsons, Detroit, Mich.

Application July 31, 1936, Serial No. 93,600

6 Claims. (Cl. 126—37)

My invention relates to improvements in kitchen cabinets provided with oven structures and to improvements in the oven structure and its assembly therein.

An object is to provide a cabinet of the character described having improved means for taking air into the oven structure and for exhausting air therefrom and from the cabinet.

My improved cabinet is divided generally into an upper and a lower compartment separated by a partition. As shown, the partition carries a gas range and a sink. The oven structure is disposed within the upper compartment spaced above the gas range and below the ceiling of the upper compartment.

A meritorious feature resides in the provision of means for conducting air from the lower compartment into the oven and for exhausting air from the oven into the upper portion of the cabinet for exhaust therefrom together with the fumes and heated air from the gas range. The oven is so supported that air may pass upwardly on all sides of the oven.

The oven may be divided into two compartments. An upper baking compartment may supplement within the oven a broiling compartment. The oven carries a gas burner. A gas line leads to this gas burner through one end of the oven. An important feature is the provision of means for taking air from the oven and discharging the same into that end of the gas burner into which the gas line discharges, thereby equalizing the air pressure within the inside of the burner as against the air pressure upon the jets outside of the burner. This equalization of air pressure within the burner and against the burner jets outside of the burner prevents the blowing out of the gas flame which might otherwise result from the sudden closing of the oven door in an oven of such restricted capacity.

Other objects, advantages, and meritorious features of my invention will more fully appear from the following description, appended claims, and accompanying drawings, wherein:

Figure 1 is a perspective of a cabinet embodying my invention,

Fig. 2 is a horizontal sectional view through the cabinet looking down on the top of the oven, Fig. 3 is an end view of the oven, Fig. 4 is a plan view of the oven partly broken away, Fig. 5 is a sectional view taken on line 5—5 of Fig. 4, Fig. 6 is a sectional view taken on line 6—6 of Fig. 5, and Fig. 7 is a vertical sectional view through a fragment of the cabinet showing the oven in elevation.

My invention is illustrated in a kitchen cabinet having doors and including a gas range, a sink, compartments, and the like as illustrated generally in my Patent No. 2,000,981. Broadly speaking, the cabinet is separated into upper and lower sections by a partition 10, which partition preferably supports the gas grate and a sink not particularly illustrated, though a portion of the grate 11 is illustrated in Fig. 2 below the oven. This partition terminates short of the rear wall of the cabinet as illustrated in said patent and is provided with a skirt 12 extending upwardly therefrom and turned outwardly at its upper end against the rear wall of the cabinet and against the end walls of the cabinet. This outwardly turned portion is provided with perforations 14 through which air may escape from the lower part of the cabinet into the upper part thereof. The front of the lower part of the cabinet may be provided with louvres 16 through which air may enter.

The oven is supported in the upper compartment spaced above the partition and above the gas grate carried thereby. The oven itself is provided with a gas burner 15 having the usual gas jet openings. This burner extends into the oven from one end and is supplied with gas through a gas conduit 18. Air is adapted to enter the end of the burner around the gas intake thereinto through apertures 20 which may be controlled by a valve of conventional construction. The direction of air flow is shown by the arrows in Fig. 6. This air enters the end of the burner in the direction of the flow of gas and to mingle therewith within the burner. Burning gas escapes from the burner through gas jets 17.

The air which enters the burner is taken from within the oven as shown more particularly in Figs. 4, 5 and 6. The air intake into the oven is hereinafter described but it will be noted that the oven wall is provided with air exhaust openings 22 as shown in Figs. 3, 5 and 6. Air flows through these openings 22 through the oven wall and is directed by a by-pass or jacket element 24 into the openings 20 that lead into the burners. This construction is shown more particularly in Figs. 4 and 5. In this way it will be seen that the air pressure within the burner is maintained substantially at the same point as the air pressure outside the burner upon the jets.

It was found that where the burner was fed with air from without the oven that the closing of the oven doors frequently blew out the gas at the jets. With the type of construction here shown the closing of the oven door raises the pressure within the burner in the same manner as it does at the jets outside of the burner and the blowing out of gas does not result.

The oven is provided with an air intake through a conduit 26 which leads from the shelf 12 that extends upwardly from the partition into the bottom of the oven as particularly shown in Fig. 5. This conduit is also shown in Figs. 1 and 7. The oven is provided with an inner bottom wall 28 spaced above the outer bottom wall of the oven and provided with perforations 30. These perforations extend along the margin of the bottom wall on all sides. On the front adjacent the oven door they open directly into the interior of the oven compartment but along the back and the ends of the oven they open into a jacketed wall portion as shown particularly in Fig. 5. Each side wall of the oven is provided with an inner side wall member 32 spaced inwardly from the outer wall of the oven. The space between the inner wall and the outer wall member is normally filled with insulation 34 as shown in Figs. 4, 5, and 6. This insulation, however, does not extend entirely to the bottom wall member 28 as shown in Fig. 5. The inner wall members 32 are provided with perforations 36 adjacent the floor. The air which enters through the openings 30 into the space between the inner and outer side wall members escapes through the inner wall apertures 36 into the interior of the oven. This air after it has passed over the gas burner and the several shelves 38, which may be provided within the oven in number and form as desired, escapes through the ceiling 40 of the oven through apertures 42. This ceiling 40 is an inner ceiling spaced below the top of the oven and it will be noted that the insulation 34 extends along the top of the oven but is held up above the ceiling 40 to provide an air passageway thereunderneath. This ceiling 40 and the inner side walls of the oven may be provided with flanges or webs adapted to space these wall elements from the outer wall elements to provide air passageways or to provide insulation spaces as shown.

The oven is provided with a flue 44 which conducts the hot air from the space above the ceiling 40 into the top of the cabinet. The hot gases from the oven as well as from the grate within the cabinet below the oven escape through the top of the cabinet through the cabinet flue 45. This cabinet flue has a diameter preferably substantially twice that of the oven flue. The oven flue terminates within the cabinet spaced below the cabinet flue. The upper end of the cabinet is open around the oven to permit the escape of gas around the side wall of the oven from the gas range below the oven through the cabinet flue.

It will be noted that the back wall of the oven and the end wall adjacent the end of the cabinet are spaced from the side walls of the cabinet as shown particularly in Figs. 2, 4 and 5 so as to provide an air passageway 46 between the oven wall and the cabinet wall for the passage of air from the gas grate below the oven upwardly into the upper portion of the cabinet for escape through the cabinet flue. The front and end wall of the oven are provided with a depending skirt 50 adapted to direct the gas toward the cabinet wall for escape upwardly thereabove.

In the operation of the structure some of the air which enters through louvres 16 or otherwise into the lower portion of the cabinet below the partition 10 passes upwardly over the gas grate 11 and through the upper compartment around the oven and particularly between the side wall of the cabinet and oven through passageway 46 to escape through the cabinet flue. A certain portion of this air which enters the lower portion of the cabinet is collected and taken by the conduit 26 into the bottom of the oven to flow into the interior of the oven through the floor and through the side walls adjacent to the floor and passes upwardly through the oven to escape through the ceiling apertures 42 and through the oven flue 44 into the upper end of the cabinet. This air which flows through conduit 26 into the oven is fresh air from below the partition 10 and unmixed with products of combustion from gas grate 11. As described, a certain portion of the air is led from the interior of the oven through the apertures 22 in the end wall thereof and directed by the by-pass member 24 to enter with the gas into the end of the burner 15. Burning gas escapes from the gas jets 17. The gas escapes from the oven as hereinabove described.

What I claim is:

1. A kitchen cabinet having top, bottom, front, rear, and end walls, a partition dividing said cabinet into upper and lower compartments, an oven disposed within the upper compartment, an air passageway leading from the lower compartment into the lower part of the oven, said oven provided with a flue leading therefrom into the top of the cabinet, said cabinet provided with a flue leading therefrom.

2. A kitchen cabinet having top, bottom, front, rear, and end walls, a partition dividing said cabinet into upper and lower compartments, an oven disposed within the upper compartment, an air passageway leading from the lower compartment into the oven to deliver air into the oven from below the partition, said oven provided with a discharge flue leading therefrom into the top of the cabinet, said cabinet provided with a discharge flue leading therefrom, said oven spaced from the cabinet walls on all sides to permit air to flow upwardly thereabout for exhaust through the cabinet flue.

3. A kitchen cabinet having top, bottom, front, end, and rear walls, said cabinet provided with a discharge flue leading from the upper part of the cabinet, an oven disposed within the upper portion of the cabinet spaced below the top and said cabinet discharge flue and supported within the cabinet spaced from the rear, front, and end walls thereof, providing an air passageway completely thereabout, said oven provided with an air inlet, said oven provided with an air outlet into the upper part of the cabinet below the cabinet discharge flue.

4. A kitchen cabinet having top, bottom, front, end and rear walls and a discharge flue leading from the upper portion thereof, an oven disposed within the upper portion of the cabinet spaced below the top and supported within the cabinet spaced from the rear, front and end walls thereof providing an air passageway completely about the oven, a gas burner within the cabinet spaced directly below the oven, said oven provided with a depending marginal skirt at the front and at the end most remote from the end wall of the cabinet surmounting in spaced relationship said gas burner and acting to limit the products of combustion from the burner toward the passageway about the oven for escape from the cabinet through the discharge flue.

5. A kitchen cabinet having top, rear and end walls and provided with a discharge flue leading from the upper portion of the cabinet, a stove burner disposed with the cabinet, an oven disposed within the upper portion of the cabinet spaced above said stove burner and spaced below the top of the cabinet and supported within the cabinet spaced from the rear, and end walls thereof providing a flue passageway between the oven and said rear and end walls for products of combustion from the stove burner, said oven closed against admission of products of combustion from said stove burner, and a fresh air passageway leading into said oven from a point within the cabinet in proximity to said stove burner but closed against admission of products of combustion from said burner, said oven provided with an exhaust flue leading into the upper portion of the cabinet, said upper portion of the cabinet provided with an exhaust flue.

6. A kitchen cabinet having top, front, rear and end walls, a partition dividing said cabinet into upper and lower compartments, an oven disposed within the upper compartment spaced above said partition, a gas burner within the oven, a gas stove burner spaced below said oven at approximately the level of the partition, said oven closed against admission of products of combustion from said gas stove burner, said oven spaced forwardly of the rear wall of the cabinet providing a flue passageway for products of combustion along the rear wall of the oven, an air conduit leading from below said partition along one wall of the cabinet and into the bottom of the oven.

CARL B. PARSONS.